United States Patent [19]

Welschoff

[11] Patent Number: 4,978,160

[45] Date of Patent: Dec. 18, 1990

[54] AUTOMOBILE SUN SHIELD

[76] Inventor: Heinz Welschoff, 1470 NE. 60th St., Fort Lauderdale, Fla. 33334

[21] Appl. No.: 852,126

[22] Filed: Apr. 15, 1986

Related U.S. Application Data

[63] Continuation-in-part of Ser. No. 805,982, Dec. 5, 1985.

[51] Int. Cl.[5] .................................. B60J 3/02
[52] U.S. Cl. ..................... 296/97.8; 296/97.1
[58] Field of Search ............. 296/97 R, 97 B, 97 F, 296/97 G

[56] References Cited

U.S. PATENT DOCUMENTS

| | | | |
|---|---|---|---|
| 1,917,799 | 7/1933 | King et al. | 296/97 G |
| 2,029,534 | 2/1936 | Knapp | 296/97 G |
| 2,733,763 | 2/1952 | Nygaard | 296/97 G |
| 3,343,867 | 9/1967 | Couch et al. | 296/97 R |
| 4,264,100 | 4/1981 | Keeler, II | 296/97 G |

FOREIGN PATENT DOCUMENTS 2034263 6/1980 United Kingdom ............ 296/97 G Primary Examiner—Dennis H. Pedder
Attorney, Agent, or Firm—Joseph Zallen

[57] ABSTRACT

A translucent sun shield stored within the visor of an automobile and readily manipulable by the user into a selected position by simply pulling or pushing on the handle extension of the transparent shield. The shield is characterized as having indentations on its edges which register with indentations on the visor body and can be extended to the desired length no matter the pivot position of the visor body.

4 Claims, 3 Drawing Sheets

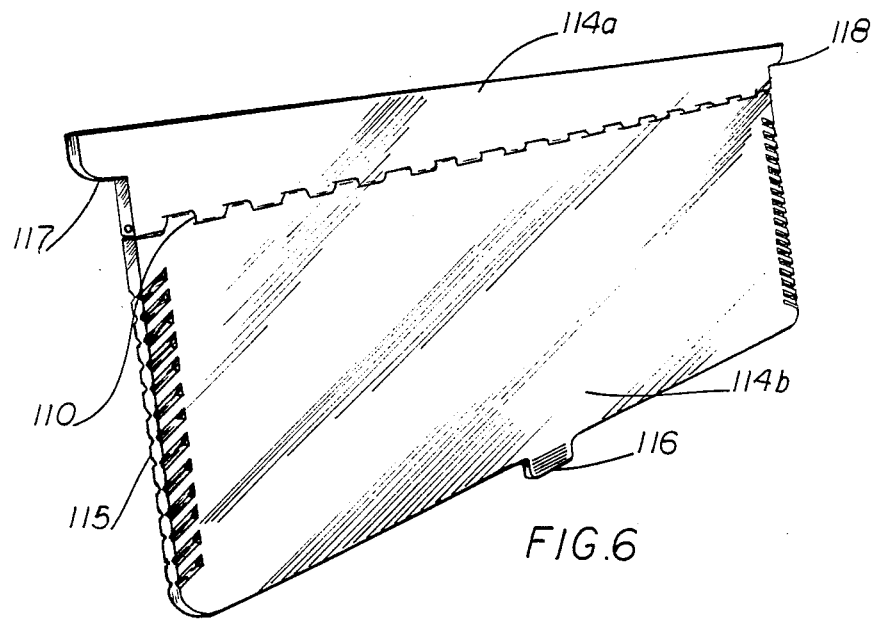
FIG.6
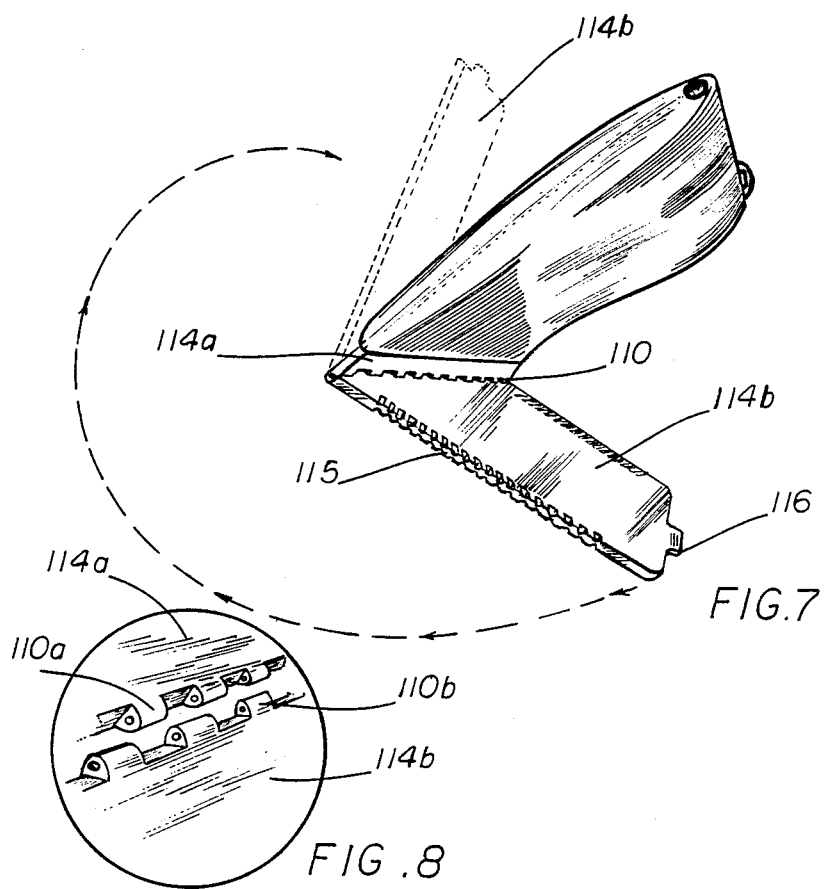
FIG.7
FIG.8

AUTOMOBILE SUN SHIELD

BACKGROUND OF INVENTION

This is a continuation-in-part of pending application Ser. No. 805,982 filed Dec. 5, 1985, which application is incorporated herein by reference.

This invention relates to an automobile sun shield, and in particular, to a novel device which enables the driver of an automobile to reduce the glare of the sun.

Sun shields for automobiles have been described in the prior art, as for example, those patents in United States Patent Office Classification System class 296, subclasses 97b, c, g, f, and r. Examples of the prior art include U.S. Pat. Nos. 3,159.421; 3,534,999; 3,961,820; 4,023,855; 4,090,732; 4,195,876; 4,264,100; 4,280,730; 4,362,330; 4,491,360; and 4,512,605.

One object of the present invention is to provide an automobile sun shield which is easy to use, inexpensive to manufacture, and more durable than the devices described in the prior art.

Other objects and advantages of this invention will be apparent from the description and claims which follow, taken together with the appended drawings.

SUMMARY OF INVENTION

This invention comprises broadly a translucent sun shield stored within the visor of an automobile and readily manipulable by the user into a selected position by simply pulling or pushing on the handle extension of the transparent shield. The shield is characterized as having indentations on its edges which register with indentations on the visor body. The sun shield can be extended to the desired length no matter what the pivot position of the visor is. The shield is easily moved in or out by the driver. By providing a longitudinal hinge in the sun shield, the shield can be pivoted after it is extended to accommodate the particular pivot position of the visor.

BRIEF DESCRIPTION OF DRAWINGS

FIG. 6 is a perspective view of another embodiment of the sun shield, showing a longitudinal hinge.

FIG. 7 is a perspective side view of the shield of FIG. 6 as extended form the pivoted visor body.

FIG. 8 is an enlarged view of a portion of FIG. 7.

SPECIFIC EXAMPLES OF INVENTION

Figure 1:
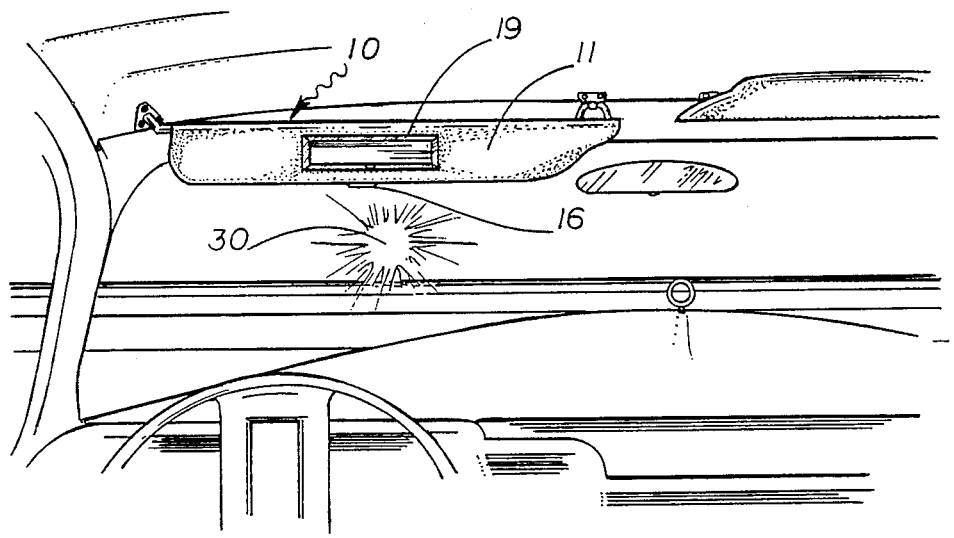
FIG. 1 is a perspective view from the driver's seat of the windshield of a car in which an embodiment of this invention has been installed.
Figure 2:
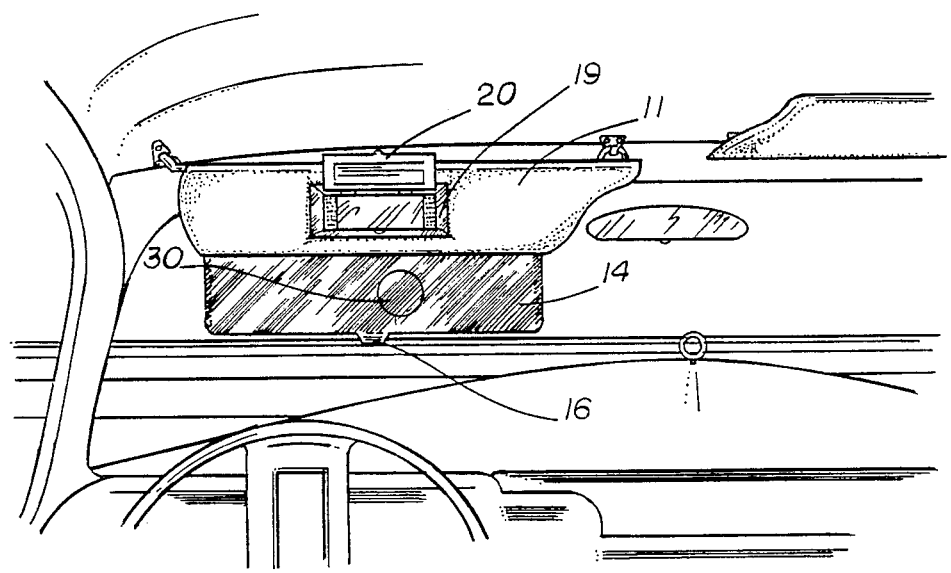
FIG. 2 is a similar view to FIG. 1, but showing the sun shield extended from the visor.
Figure 3:
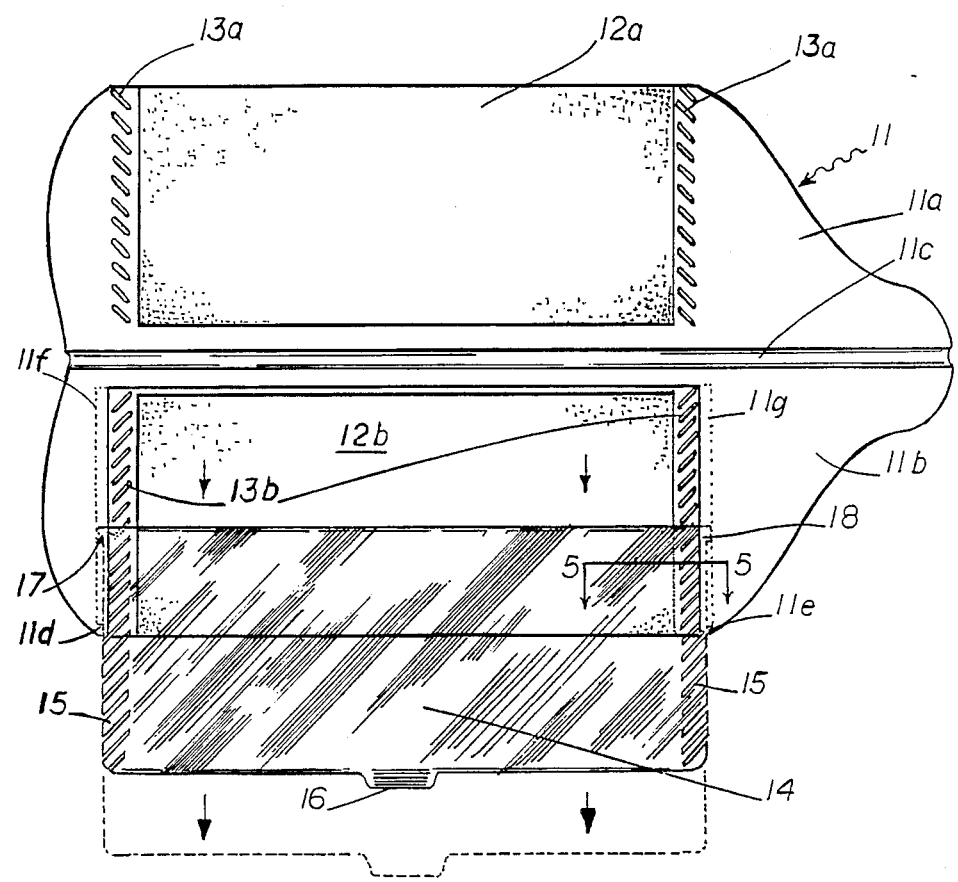
FIG. 3 is a view of the visor before it is assembled together with the sun screen.
Figure 4:
FIG. 4 is an end view of the bottom of the visor in closed condition.
Figure 5:
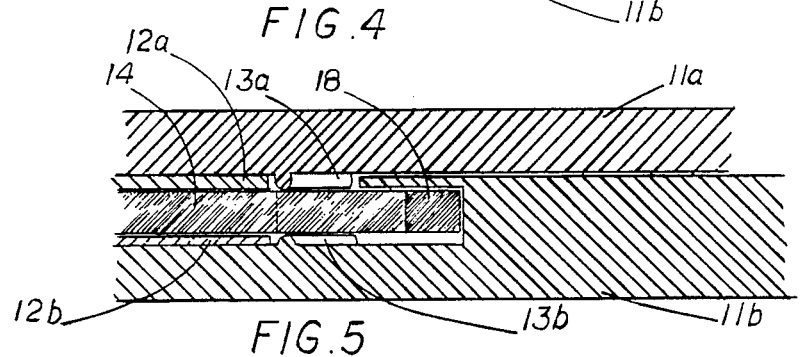
FIG. 5 is a cross-section along line 5—5 of FIG. 3.

Referring now to the drawings, the embodiment 10 of this invention is shown as a combination of a translucent sun screen 14 movably housed within the body 11 of the automobile's visor, which typically pivots up and down across a portion of the upper section of an automobile windshield. The body portion of the visor 11 has a top portion 11a and a back portion 11b, covered with felt layer 12a and felt layer 12b. The top and bottom portions are connected by a flexible hinge 11c. Raised teeth 13a on the top portion and 13b on the bottom portion are cooperable when the portions are close together with the indentations 15 on the translucent sun shade 14. Tracks 11f and 11g are provided to stabilize the motion of the sun shade 14. Stops 11d and 11e are provided, which cooperate with stops 17 and 18 on the shade 14, to limit the extent that the shade can be pulled by its handle 16. When the portions 11a and 11b are folded together, they are sealed on their edges by adhesive or other suitable means so that it is now a unitary device.

As shown in FIG. 1, a driver equipped with a device 10 made in accordance with this invention, will normally see the visor as it is typically constructed in automobiles, and in this case equipped with a lighted mirror 19 with a mirror cover 20. When the sun starts to be bothersome, the driver pulls down the visor to normal down position. When the sun 30 becomes too strong, he leaves the visor in its normal down position, but then readily pulls the handle 16 down so that the translucence of the sun screen 14 reduces the glare of the sun 30. He can just as easily simply push it up into position when the sun is no longer strong or if he desires more vision. If he does not need to use the visor at all, he simply folds it up in the customary manner, and the sun screen stays securely in place within the visor.

In the version illustrated in FIGS. 6, 7 and 8, the sun shield has an upper portion 114a connected by piano hinge 110 provided with hinge elements 110a and 110b to lower portion 114b provided with handle 116. Stops 117 and 118 cooperate with stops 11d and 11e on the visor body. Indentations 115 are cooperable with raised teeth 13a and 13b. After the shield has been extended it can then be pivoted to the desired position even though the visor itself has been pivoted.

It should be noted that the described construction is essentially a one-piece support simple to make. It should be also noted that the construction provides a felted liner for the sun screen in addition to the registering teeth.

I claim:

1. A sun visor for an automobile adapted to be hingedly mounted and comprising a body portion pivotable into a down or up position and including a translucent sun screen normally stored within the visor but readily extendable down through the bottom edge of the visor to a selected position at which it will remain; said body portion being a one-piece construction including a longitudinal flexible hinge portion (11c), a top portion (11a) and a bottom portion (11b) having rows of teeth (13a) on the side edges of the bottom portion; bottom portion (11b) having rows of teeth (13a); said top and bottom portions being connected to opposite sides of said hinge portion; said top and bottom portions being folded together and sealed to form the body portion; said sun screen having side edge indentions (15) cooperable with said teeth (13a) and (13b) when said translucent sun screen is positioned between said top and bottom portions (11a) and (11b); said sun visor being further characterized in that said screen has been positioned between said top and bottom portions before they are folded together and sealed.

2. The device of claim 1 wherein the bottom of said sun screen has a handle portion.

3. The sun visor of claim 1 wherein said sun screen has upper and lower portions hingedly connected about a longitudinal axis so that when said sun screen is extended out of said body portion the lower portion can be pivoted into the desired position by the driver.

4. The sun visor of claim 1 wherein felt layers are provided in said top and bottom portions adjacent the surfaces of said sun screen.

* * * * *